Jan. 25, 1927.
C. C. FARMER
1,615,368
TRIPLE VALVE DEVICE
Filed Feb. 26, 1925
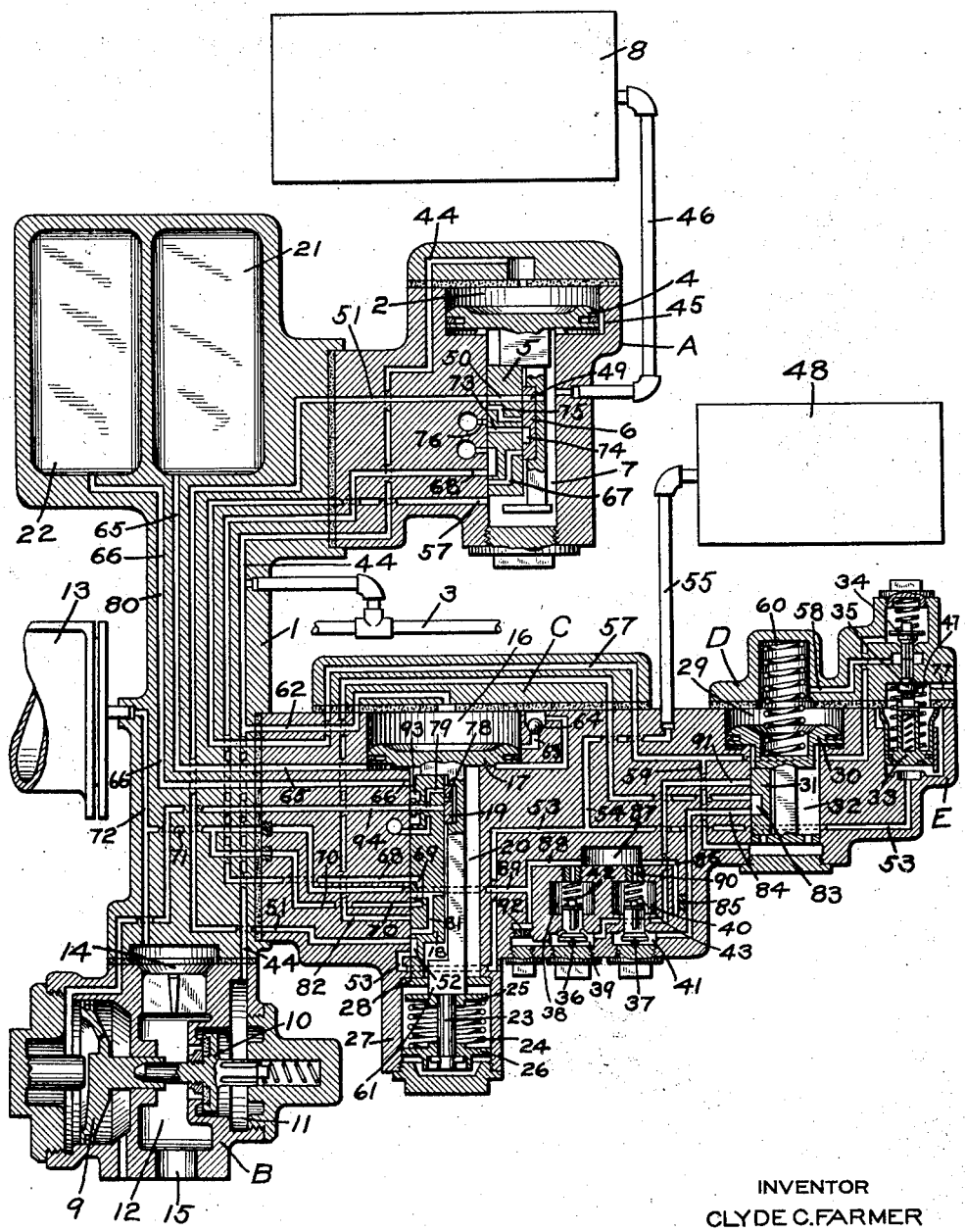
INVENTOR
CLYDE C. FARMER
BY Wm. M. Cady
ATTORNEY Patented Jan. 25, 1927.

1,615,368

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE-VALVE DEVICE.

Application filed February 26, 1925. Serial No. 11,672.

This invention relates to fluid pressure brakes and more particularly to a brake equipment having means for securing an emergency application of the brakes.

When a direct or straightaway emergency application of the brakes or an emergency application after a light service brake application is made, the rate of build up of brake cylinder pressure should be relatively slow, in order to prevent severe shocks in case of long freight trains, due to the running in of the slack in the train. On the other hand, after a substantial service application of the brakes has been made, the rate of build up of brake cylinder pressure may be more rapid.

The principal object of my invention is to provide means for giving one rate of build up of brake cylinder pressure in a straight away emergency application of the brakes, and a different build up of brake cylinder pressure in an emergency application of the brakes preceded by a predetermined service application of the brakes.

Other objects and advantages will appear from the following more detailed description of the invention.

In the accompanying drawing, the single figure is a diagrammatic view, partly in section, of a valve device embodying my invention.

As shown in the drawing, the valve device may comprise a casing 1 containing an equalizing valve device A, a quick action valve device B, an emergency valve device C, a selector valve device D, and a pilot valve device E.

The equalizing valve device A may comprise a piston 4, contained in a piston chamber 2 connected to the brake pipe 3, and adapted to operate a main slide valve 5 and an auxiliary slide valve 6 contained in a valve chamber 7, which is connected to an auxiliary reservoir 8.

The quick action valve device B may comprise a piston 9 adapted to control a valve 10 for venting fluid under pressure, from a chamber 11 and the brake pipe 3, to a chamber 12. The chamber 12 has communication with a brake cylinder 13, through a large opening controlled by a check valve 14, and with the atmosphere through a smaller opening 15.

The emergency valve device C may comprise a piston 17, contained in a piston chamber 16 connected to the brake pipe 3, which is adapted to operate a main slide valve 18 and an auxiliary slide valve 19 contained in valve chamber 20, said valve chamber being in communication with a quick action chamber 21 through a passage 65 and a quick action closing chamber 22 through a passage 66 leading to the seat of said slide valve 18.

The selector valve device D may comprise a piston 30 contained in a piston chamber 29 and adapted to operate a slide valve 31 contained in a valve chamber 32 connected to the valve chamber 7 and the auxiliary reservoir 8 through passages 57 and 59. A spring 60 tends to maintain piston 30 in its innermost position when the fluid pressures on opposite sides of said piston are equal.

The pilot valve device E may comprise a valve piston 33, adapted to seat upon extreme movement in either direction, and double beat valves 34 and 35, adapted to be operated by said valve piston. The double beat valves function to admit or exhaust fluid under pressure, to and from the piston chamber 29, of the selector valve device. Said valve piston is subject on one side to the pressure of a spring 47 and on the other side to the pressure of fluid contained in a timing reservoir 48.

The build up regulating valves may comprise check valves 36 and 37 contained in respective chambers 39 and 41 and subject respectively on one side to the pressure of springs 42 and 43 tending to hold same unseated.

In operation, fluid under pressure from the brake pipe 3 flows through passage 44 to piston chamber 2, of the equalizing valve device A, forcing the piston 4 to its innermost position. The fluid in piston chamber 2 now flows through feed groove 45 to valve chamber 7 and thence through pipe 46 to the auxiliary reservoir 8, charging the same. Fluid from the valve chamber 7 also flows through port 49 in auxiliary slide valve 6, port 50 in slide valve 5, passage 51, cavity 52 in slide valve 18 of the emergency valve device C, and passages 53, 54, and pipe 55 to the timing reservoir 48, charging the same.

The timing reservoir 48 being connected by way of passage 53 to the face of valve piston 33, of the pilot valve device E, said valve piston will be shifted upwardly against the pressure exerted by spring 47 and will cause the valve 35 to seat and valve 34 to be unseated. With the valve 34 unseated, fluid under pressure from the valve chamber 7 and the auxiliary reservoir is supplied by way of passage 57 past unseated valve 34 through passage 58 to piston chamber 29 of the selector valve device D. Fluid under pressure being supplied from the auxiliary reservoir through branch passage 59 to the valve chamber 32 of the selector valve device, the fluid pressures on opposite sides of the piston 30 will be equalized, permitting the spring 60 to maintain said piston in its innermost position.

Fluid under pressure from the brake pipe 3 also flows through passage 44 to chamber 11 of the quick action valve device B and through passages 44 and 62 to piston chamber 16 of the emergency valve device C. From piston chamber 16, fluid flows through passage 63 past ball check 64 to valve chamber 20, thence through passages 65 and 66 respectively, to the quick action chamber 21 and the quick action closing chamber 22, charging said chambers.

When it is desired to produce a service application of the brakes, the pressure of fluid in the brake pipe 3 is gradually reduced in the usual way, which causes the piston 4 of the equalizing valve device A, to be shifted to its outermost position, moving the slide valves 5 and 6 so that port 67 in slide valve 5 will be uncovered by movement of the auxiliary slide valve 6, and will register with passage 68. Fluid under pressure is then supplied from valve chamber 7 and the auxiliary reservoir to the brake cylinder 13, through port 67, passage 68, cavity 69 in slide valve 18, and thence through passages 70, 71, and 72.

The timing reservoir 48 is connected to atmosphere in the application position of slide valve 5 by way of pipe 55, passages 54, 53, cavity 52 in slide valve 18, passage 51, port 75 in slide valve 5, cavity 74 in the auxiliary slide valve 6, port 73 in slide valve 5, and exhaust port 76. The volume of the timing reservoir 48 is such that if the brake pipe reduction is of a predetermined amount, for example, eight pounds, the fluid in said reservoir will be entirely exhausted, thereby permitting the spring 47 to shift the valve piston 33 of the pilot valve device E downwardly, seating valve 34 and unseating valve 35, which connects piston chamber 29 of the selector valve device D to atmosphere by way of passage 58 past unseated valve 35 and passage 77. This, it will be seen, permits the fluid under pressure in valve chamber 32 to shift the piston 30 and slide valve 31 outwardly against the pressure exerted by the spring 60.

In a service application, the piston 17 of the emergency valve device C moves outwardly, moving the valve 19 until a port 78 in the auxiliary slide valve 19, registers the port 79 in slide valve 18 leading to atmosphere, at which time the follower plate 25 engages the abutment 28 and together with the exhausting of fluid from the valve chamber 20, through the connection just described, serves to prevent the piston 17 from moving to emergency position.

When it is desired to make a straightaway emergency application of the brakes, that is, not one preceded by a service application, a sudden reduction of pressure in the brake pipe 3 is made in the usual way, which in turn reduces the pressure in piston chamber 2 of the equalizing valve device A, and in the piston chamber 16 of the emergency valve device C.

The reduction of pressure in piston chamber 2 of the equalizing valve device A, causes the piston 4 to be shifted to its outermost position, carrying with it the slide valve 5 and the auxiliary slide valve 6, but due to shifting of the piston 17 to its outermost position, and the consequent movement of the slide valve 18 and auxiliary slide valve 19 of the emergency valve device C, communication from the auxiliary reservoir 8 to brake cylinder 13 and from the timing reservoir 48 to atmosphere is cut off, as hereinbefore described.

In moving to its outermost position, the piston 17 causes the slide valve 18 of the emergency valve device C to connect the quick action closing chamber 22 to the face of quick action piston 9 by way of passage 80, cavity 93 in slide valve 18, and passage 94. The pressure of fluid from chamber 22 acting on the piston 9 causes the valve 10 to be unseated and vent fluid from chamber 11 and the brake pipe 3 to chamber 12, thereby causing a quick serial venting of the brake pipe.

The fluid from chamber 11 and the brake pipe 3 rushing into chamber 12 acts on the larger area of the check valve 14, the other side of which is subject to atmospheric pressure, raises said check valve and flows to the brake cylinder 13 through passage 72, thereby furnishing an initial inshot of pressure to the brake cylinder. This flow of fluid to the brake cylinder continues only until the pressure in chamber 12 has been reduced by flow through the atmospheric opening 15 sufficiently to permit said valve to close.

The venting of the timing reservoir 48 being prevented by the shifting of slide valve 18, the valve piston 33 will remain in its upper position, in which the valve 34 is open, so that the pressure in piston chamber 29 is maintained and therefore the piston 30 and slide valve 31 of the selector valve device D will be maintained in their innermost position, as shown in the drawing. Fluid under pressure from the valve chamber 7 and auxiliary reservoir now flows through port 67, in slide valve 5, passage 68, cavity 81, in slide valve 18 of the emergency valve device C, passage 82, cavity 83 in slide valve 31, of the selector valve device D, and passage 84 to chamber 41 below check valve 37.

Acting in chamber 41 on the exposed area of the valve 37, the fluid under pressure forces said valve 37 to its seat against the pressure exerted by spring 43 and fluid from the auxiliary reservoir 8 is consequently forced to flow slowly to the brake cylinder, through the choked passage 85, passage 86 to a chamber 87, thence through passages 88, 89, 71 and 72 to the brake cylinder. The chamber 87 is in communication, through a choked passage 90, with a chamber 40 and the spring side of the check valve 37, and when the pressure in the brake cylinder and chamber 40 has built up to a degree sufficient, together with the pressure exerted by the spring 43, to overcome the pressure of fluid in chamber 41 acting on the opposite side of the valve 37, said valve will be unseated and then permit a more rapid flow of fluid under pressure to the brake cylinder past the unseated valve 37 to chamber 40 through passage 89, and thence to the brake cylinder, as hereinbefore described.

If an emergency application is made after a predetermined service reduction, such as eight pounds, has been made, the timing reservoir 48 will have blown down, as hereinbefore described, thereby causing the valve piston 33 to move downwardly, seating valve 34 and unseating valve 35, which connects piston chamber 29 to atmosphere, by way of passage 58, past unseated valve 35, and passage 77.

The venting of fluid from piston chamber 29 causes the piston 30 to be shifted to its outermost position, consequently moving the slide valve 31 so that cavity 83 now connects passage 82 to passage 91. Fluid from the auxiliary reservoir now flows through port 67 in slide valve 5, passage 68, cavity 81 in slide valve 18, of the emergency valve device C, passage 82, cavity 83, in slide valve 31, of the selector valve device D, thence through passage 91 to chamber 39 below check valve 36, forcing said check valve 36 to its seat against the pressure exerted by the spring 42.

The slack in the train having been bunched by the previous service application, a much faster rise of brake cylinder pressure is tolerable than in straightaway emergency, and for this reason a larger choked passage 92 is provided, permitting the fluid in chamber 39 to flow to the brake cylinder through said passage 92 to passage 89 and thence to the brake cylinder, as hereinbefore described. When the pressure in the brake cylinder has been built up to a predetermined degree, by flow through the port 92, so that brake cylinder pressure acting on the spring side of valve 36, plus the pressure of spring 42, exceeds the pressure acting in chamber 39, the valve 36 will be unseated, permitting a more rapid flow and full equalization of the auxiliary reservoir into the brake cylinder.

In order to prevent possible lifting of the emergency slide valve 18 from its seat, a guide may be provided at the outer end of the piston stem 61, comprising a rod 23 secured in the end of the piston stem and having a guide plate 26 secured to the outer end of the rod and adapted to work in the bore of a cylinder 27, which forms an extension of the emergency valve casing.

The guide means may also be utilized to provide a yielding spring stop for defining the service position of the emergency valve parts, and for this purpose a plate 25 is mounted to slide on the rod 23 and interposed between the plates 25 and 26 is a coil spring 24. When the emergency piston 17 moves to service position, the plate 25 will engage a fixed plate 28 secured at the inner end of the cylinder 27. Further movement of the piston 17 toward emergency position will then be resisted by the compression of the spring 24.

It will now be evident that I have provided means to ensure one rate of flow of fluid to the brake cylinder in straightaway emergency applications of the brakes, and another rate of flow in emergency applications when preceded by a service application of a predetermined amount.

Having now described my invention, what I claim as new and desire to secure by Letters Patent, is:—

1. In a fluid pressure brake, the combination with a brake cylinder and a reservoir, of means for effecting one rate of flow of fluid from said reservoir to said brake cylinder in an initial emergency application of the brakes, and a different rate of flow in an emergency application of the brakes following a service application.

2. In a fluid pressure brake, the combination with a brake cylinder and a reservoir, of means for effecting one rate of flow of fluid from said reservoir to said brake cylinder in an initial emergency application of the brakes, and a different rate of flow in an emergency application of the brakes following a service application of a predetermined degree.

3. In a fluid pressure brake, the combination with a brake cylinder and an auxiliary reservoir, of means for supplying fluid under pressure from said reservoir to said brake cylinder at a slow rate in an initial emergency application of the brakes, and a more rapid rate of flow in an emergency application of the brakes following a service application of a predetermined degree.

4. In a fluid pressure brake, the combination with a brake cylinder and a reservoir charged with fluid under pressure, of a valve device having a position for supplying fluid from said reservoir to the brake cylinder at one rate, and means for controlling the operation of said valve device and operative after a service application of the brakes for effecting the movement of said valve device to a position for supplying fluid from said reservoir to the brake cylinder at a different rate.

5. In a fluid pressure brake, the combination with a brake cylinder and a reservoir charged with fluid under pressure, of a valve device for controlling the rate of flow of fluid from said reservoir to the brake cylinder in an emergency application of the brakes, a timing reservoir, and means operated upon a reduction in pressure in said timing reservoir for effecting the operation of said valve device.

6. In a fluid pressure brake, the combination with a brake cylinder and a reservoir charged with fluid under pressure, of a valve device for controlling the rate of flow of fluid from said reservoir to the brake cylinder in an emergency application of the brakes, a timing reservoir, means operated upon a reduction in pressure in said timing reservoir for effecting the operation of said valve device, and means operating upon effecting a service application of the brakes for venting fluid from said timing reservoir.

7. In a fluid pressure brake, the combination with a brake cylinder and a reservoir normally charged with fluid under pressure, of a valve device adapted in an emergency application of the brakes to control the rate of flow from said reservoir to the brake cylinder, a timing reservoir, valve means operated upon a reduction in pressure in said timing reservoir for effecting the operation of said valve device, and an application valve device operating upon effecting a service application of the brakes for venting fluid from said timing reservoir.

8. In a fluid pressure brake, the combination with a brake pipe, a brake cylinder, and a reservoir normally charged with fluid under pressure, of a service valve device operating upon a reduction in brake pipe pressure for opening communication through which fluid is supplied from said reservoir to the brake cylinder, and an emergency valve device normally establishing communication through which said service valve device supplies fluid to the brake cylinder and operated upon a sudden reduction in brake pipe pressure for supplying fluid from said service valve device to the brake cylinder through a restricted port.

9. In a fluid pressure brake, the combination with a brake pipe, a brake cylinder, and a reservoir normally charged with fluid under pressure, of a service valve device operating upon a reduction in brake pipe pressure for opening communication through which fluid is supplied from the reservoir to the brake cylinder, an emergency valve device for controlling said communication, and a selector valve device controlled by said emergency valve device for also controlling said communication.

10. In a fluid pressure brake, the combination with a brake pipe, a brake cylinder, and a reservoir normally charged with fluid under pressure, of a service valve device operating upon a reduction in brake pipe pressure for opening communication through which fluid is supplied from the reservoir to the brake cylinder, an emergency valve device for controlling said communication, a selector valve device controlled by said emergency valve device for also controlling said communication, a timing reservoir, and a valve device controlled by the fluid pressure in said timing reservoir for controlling the operation of said selector valve device.

11. In a fluid pressure brake, the combination with a brake cylinder and a reservoir normally charged with fluid under pressure, of a selector valve device operative in an emergency application of the brakes and having one position for supplying fluid from said reservoir to the brake cylinder through a restricted port and another position for supplying fluid from the reservoir to the brake cylinder through another restricted port, a timing reservoir, and means controlled by the pressure in said timing reservoir for controlling the operation of said selector valve device.

12. In a fluid pressure brake, the combination with a brake cylinder and a reservoir, of valve means operative in an emergency application of the brakes and having one position for supplying fluid from said reservoir to the brake cylinder through a restricted port and another position for supplying fluid from the reservoir to the brake cylinder through another restricted port, and valves subject to the opposing pressures of the brake cylinder and said reservoir for controlling a by-pass around each of said restricted ports.

13. In a fluid pressure brake, the combination with a brake cylinder and a reservoir, of valve means operative in an emergency application of the brakes and having one position for supplying fluid from said reservoir to the brake cylinder through a restricted port and another position for supplying fluid from the reservoir to the brake cylinder through another restricted port, and valves, each subject on one side to brake cylinder pressure and the pressure of a spring and on the opposite side to reservoir pressure and each controlling a by-pass communication from the reservoir to the brake cylinder around each of said restricted ports.

14. In a fluid pressure brake, the combination with a valve device comprising a piston having a piston stem and a slide valve operated by said piston, of a guide member carried at the end of said piston stem, a follower, a spring interposed between said follower and said guide member, and a fixed stop engageable by said follower upon a predetermined movement of said piston.

In testimony whereof I have hereunto set my hand.

CLYDE C. FARMER.